No. 646,413. Patented Apr. 3, 1900.
J. A. COLLET.
MOLD FOR MAKING CUSHION TIRES OR OTHER RUBBER ARTICLES.
(Application filed Sept. 1, 1899.)
(No Model.) 3 Sheets—Sheet 1.
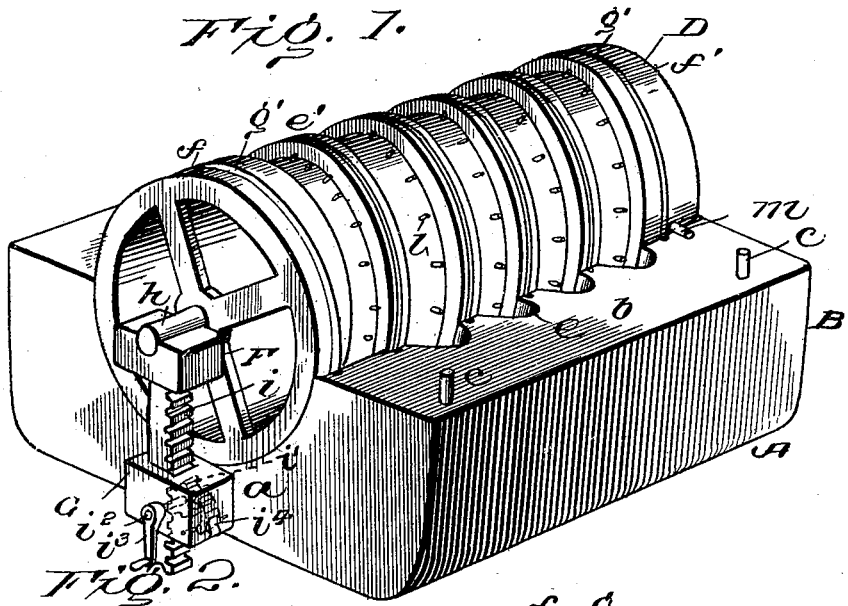
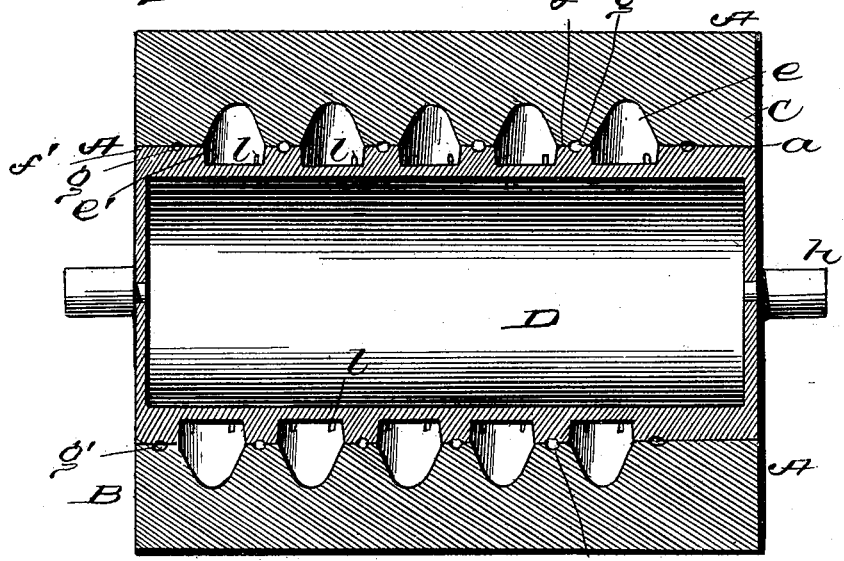

No. 646,413. Patented Apr. 3, 1900.
J. A. COLLET.
MOLD FOR MAKING CUSHION TIRES OR OTHER RUBBER ARTICLES.
(Application filed Sept. 1, 1899.)

(No Model.) 3 Sheets—Sheet 2.

Witnesses
Inventor
Jules A. Collet
by R. A. B. Lacey Attorneys

No. 646,413.  
J. A. COLLET.  
MOLD FOR MAKING CUSHION TIRES OR OTHER RUBBER ARTICLES  
(Application filed Sept. 1, 1899.)  
Patented Apr. 3, 1900.
(No Model.)  
3 Sheets—Sheet 3.
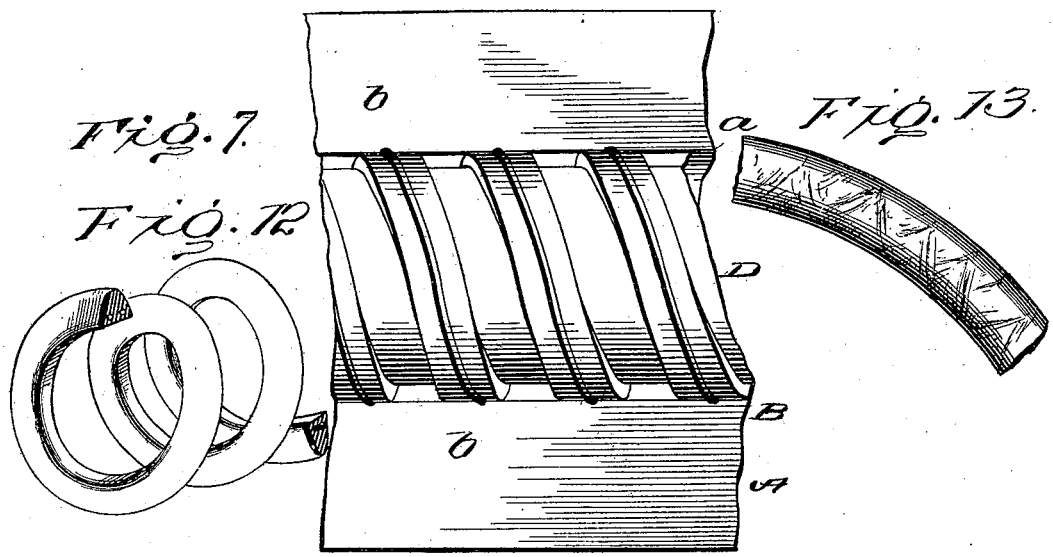
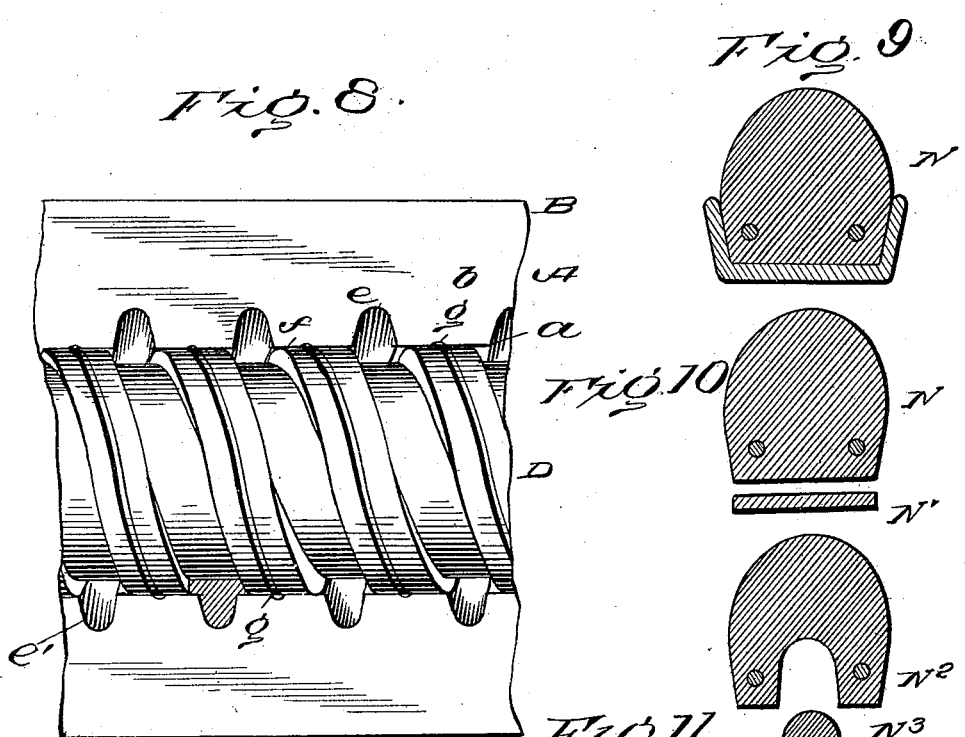

UNITED STATES PATENT OFFICE.

JULES A. COLLET, OF NEW YORK, N. Y.

MOLD FOR MAKING CUSHION-TIRES OR OTHER RUBBER ARTICLES.

SPECIFICATION forming part of Letters Patent No. 646,413, dated April 3, 1900.

Application filed September 1, 1899. Serial No. 729,182. (No model.)

*To all whom it may concern:*

Be it known that I, JULES A. COLLET, a citizen of the United States, residing at New York, (Brooklyn,) in the county of Kings and State of New York, have invented certain new and useful Improvements in Molds for Making Cushion-Tires or other Rubber Articles; and I do hereby declare the following to be a full, clear, and exact description of the invention, such as will enable others skilled in the art to which it appertains to make and use the same.

This invention relates to improvements in molds for making vehicle-tires and other similar elastic bands or articles, and particularly to a mold for making the tire or band in ring or spiral form to adapt it for expansion from a curve of small radius to a curve of larger radius in applying it to its rim or seat, so that the inner or rim surface thereof will be placed in a state of tension to hug the seat tightly, while the outer bearing or tread surface thereof will be placed in a state of compression to adapt it to better resist wear and provide for the self-healing or natural closing of any cuts that may be made therein; and the object of the invention is to provide a mold which is simple of construction and easy of manipulation and whereby the operation of making tires or elastic bands of this character may be readily and expeditiously performed.

The invention is shown in the present instance as adapted for making rubber vehicle-tires of the solid or cushion type; but it may also be employed for making packing-rings for pistons and other like elastic segments, bands, or rings.

In the accompanying drawings, Figure 1 is a perspective view of the drag and forming-mandrel of the mold, the cope being removed. Fig. 2 is a vertical longitudinal section through the mold-box with the forming-mandrel in place. Fig. 3 is a fragmentary perspective view of the mandrel and a completed tire thereon. Fig. 4 is a bottom plan or inside view of the cope. Fig. 5 is an isometric perspective view of the mold-box, illustrating the cope shifted longitudinally on the drag to expose the mating forming grooves or cavities. Fig. 6 is a plan view of a portion of the drag and forming-mandrel, showing a modification in the construction of the latter for forming a channeled tire. Fig. 7 is a similar view showing a further modification for forming a flat seat, band, or base-section of the construction shown in Fig. 10. Fig. 8 is also a plan view of the drag and mandrel, showing the parts adapted for forming a base-section and filler of the type illustrated in Fig. 11. Figs. 9, 10, and 11 are cross-sectional views showing different forms of tires and seats or fillers produced by the forms of mold illustrated. Fig. 12 is a perspective view of a complete tire removed from the mandrel. Fig. 13 is a longitudinal section of a portion of the same, illustrating the manner in which the tread portion is compressed and the rim portion expanded when the tire is straightened out. Fig. 14 is a perspective view of a modified construction of mold, one of the plates thereof being broken away to show the forming grooves or cavities. Fig. 15 is a detail view showing two forms of holding-pins.

In carrying my invention into practice I provide a mold-box A, supported in any suitable manner and made of any desired external shape or configuration and of any prefered number of parts, as may be found necessary or most convenient. This box in the form illustrated in Figs. 1 to 8, inclusive, comprises a drag or bottom section B, a cope or top section C, and a forming drum or mandrel D. The drag and cope are provided with corresponding semicircular central recesses *a*, open at each end and forming in conjunction a circular opening or mold-cavity for the reception of the mandrel, and upon opposite sides of said recesses with parallel abutting faces *b*, the abutting faces of one of said parts having dowel-pins *c*, adapted to enter coinciding seats *d* in the other part, and hereby effect an accurate connection between the two. Upon the interior of each of said parts are inclined grooves *e*, which are in communication with the recess therein and serve when the parts are connected to form a spiral cavity. The walls of the grooves may be made of any desired shape, according to the character of the article to be produced, but as shown are curved or rounded to form the convex tread portion of an ordinary solid or cushion tire. The parting ribs or walls *f*, separating the grooves from each other, are provided with auxiliary grooves *g*, which are adapted to receive the surplus rubber or material forced out of the main grooves during the process of vulcanization. The drag and cope are provided with corresponding flanges E, through which bolts or like fastenings are adapted to be passed to clamp the same together.

The forming drum or mandrel D is hollow or cylindrical and is provided at its ends with trunnions $h$, which are journaled in open bearings F, mounted to slide vertically in guides or boxes G upon the ends of the drag B, so that the mandrel may be lifted out of its bearings whenever desired and also vertically adjusted to lower it into the recess of the drag and elevate it therefrom. The gearing shown in the present instance for performing this function consists of a rack $i$, secured to or formed upon the bearing and with which meshes a pinion $i'$, carried by a shaft $i^2$, journaled in the wall of the box or guide and provided at its outer end with a crank-handle $i^3$, by which it may be operated. A pawl $i^4$ is provided to engage the pinion and prevent casual turning thereof when the mandrel is elevated. The outer surface or periphery of the mandrel is provided with a continuous spiral rib $f'$, forming a continuous longitudinal spiral groove $e'$, which when the mandrel is placed in position between the drag and cope coincides with the groove $e$ therein and completes the formation of the molding-cavity. This groove may be also made of any desired shape in transverse section, according to the character of the article to be produced, but is shown in the present instance as adapted to form the base portion of a tire of the type illustrated in Figs. 9 and 10, the bottom thereof being made flat and the sides slightly divergent or outwardly inclined. The grooves $e$ and $e'$ may, however, be made semicircular to form a circular tire or band or of any other approved form for making tires or bands of any cross-sectional shape or area. The rib $f'$ of the mandrel bears against the ribs $f$ of the drag and cope and is likewise formed with an auxiliary spiral groove $g'$, acting in conjunction with the grooves $g$ therein to receive the surplus rubber running out of the mold-cavity during the process of vulcanization.

To provide for the embedding of binding-wires or thin metallic plates within the tire or band, guide and stop pins project outwardly from the base of the spiral forming-groove in the mandrel. These $l$ pins may be straight and arranged alternately in two parallel rows in each series to receive the binding wires or plates between them, as shown, and prevent lateral movement thereof, or in lieu of straight pins arranged in such manner forked or substantially Y-shaped pins $l'$, (see Fig. 15,) arranged in a continuous row or line at each point where a wire or plate is to be embedded, may be employed, the wires or plates in this case being placed within the forked ends of the pins. A holding-pin $m$ may also be provided near one end of the mandrel for securing one end of the wire or plate to prevent the latter from being pulled around the mandrel during the operation of threading the same through the pins or at any time subsequent thereto and until vulcanization is effected. The end of the wire or plate may be twisted around or otherwise applied to said holding-pin or placed between said pin and the drag, so that the weight of the mandrel will hold it in place.

As before stated, the shape of cavity formed by the grooves shown in Figs. 1 to 5, inclusive, is designed for making solid cushion-tires or elastic bands N of the type shown in Figs. 9 and 10, adapted to rest directly upon the face of the rim, as illustrated in Fig. 9, or upon an elastic base or seat N', interposed between the base of the tire or band and face of the rim or seat for the band, as illustrated in Fig. 10. In making the elastic base the grooves in the mold-box are dispensed with and the groove in the mandrel alone used, as shown in Fig. 7. In making a channeled tire of the type illustrated in Fig. 11 the arrangement of grooves shown in Figs. 1 and 2 is employed, and in addition thereto a rib or bead $n$ is provided upon the mandrel to form the channel $N^2$. In conjunction with this type of tire a base or seat having a filler $N^3$ to enter the channel may be used, and in making the same the grooves $e$ are reduced in depth and width with respect to the groove $e'$, as shown in Fig. 8.

It is obvious from the foregoing that by simply varying the area, arrangement, and shape of the forming-grooves the mold may be adapted for making elastic tires, bands, or segments of any desired form and length and designed for a variety of uses.

In the operation of making a band or tire the cope is removed and the forming drum or mandrel elevated out of the recess of the drag by means of the adjusting-gear. The green rubber or raw material is then placed within the forming-groove of the mandrel in any approved manner, but preferably by starting at one end of the groove and packing it continuously therein to the other end of said groove, the mandrel being rotated on its bearings to permit of this operation being quickly and conveniently accomplished and the rubber or material being packed deep enough to project within the grooves of the drag and cope when the parts are assembled. When stiffening or binding plates or wires are to be embedded in the tire, a thin layer of the raw material is first placed within the groove of the mandrel and the plate or wire threaded along the groove, so as to be held from lateral displacement by the pins $l$ or $l'$, and then a second layer of the raw material is filled in to pack the groove. The holding-pin $m$ is located adjacent to the starting end of the mandrel-groove, and the starting end of the plate or wire is held thereby in the manner heretofore stated to prevent said plate or wire from being drawn longitudinally along the groove and displaced during the operation of threading it and when the drum is rotated. After the groove in the mandrel has been packed the mandrel is lowered into the recess of the drag and the cope brought down and locked, and the device is then ready for vulcanization. During the process of vulcanization any surplus rubber contained within the forming groove or cavity and forced out when the raw material begins to run and expand will be received and retained within the auxiliary grooves $g$ and $g'$, and all liability of injury to the mold by expansion will thus be avoided. After vulcanization has been completed the cope is detached, the mandrel elevated, and the completed tire removed. The tire or band N made in this manner is of spiral form, as shown in Fig. 12, and when straightened out for application to the rim of a wheel, piston, or other object the coils or convolutions thereof are expanded from a curve of small radius to a curve of a larger radius, as indicated in Fig. 13, whereby the inner or rim surface of the same is stretched or placed under tension, while the outer or tread surface thereof is compacted or placed under compression. By this means the tire or band is adapted to naturally hug its seat and the wearing qualities of its outer or tread surface are promoted and any cuts made in said surface tend to close instead of to open or gap.

In Fig. 14 I have shown a modified construction of mold consisting of coöperating plates B' and C', corresponding to the drag and cope of the form of mold illustrated in Figs. 1 to 8, inclusive. In this modified construction the mandrel and its receiving-recesses are dispensed with and each plate is formed upon one of its broad sides with a spiral groove $e^2$, the grooves in the meeting faces of the plates coacting to form the spiral mold-cavity. The grooves also instead of being disposed vertically are disposed horizontally to give the proper direction to the spiral, as will be readily understood. Each pair of plates comprising a mold may be secured together by means of fastenings of any approved type and a number of such molds piled upon one another, so that they may be packed in close compass for storage, transportation, or vulcanization. If desired, all of the plates or all of the intermediate plates of a series of molds so piled may be grooved on both sides, so that three connecting-plates of a series arranged in this manner will form between them two complete tires. In Fig. 14 the cope-plate C' is represented as being grooved on opposite sides, the groove $c^3$ upon the upper surface thereof appearing partially in broken lines. The holding and guiding or retaining pins and auxiliary surplus-rubber-receiving grooves are also employed in this construction.

The purpose of arranging the surplus-rubber-receiving groove or grooves in the parting-walls between the coils or convolutions of the spiral forming-cavity, so as to extend parallel with and follow the course of said cavity, is to prevent such surplus rubber from adhering to the tread-surface of the tire and injuring or impairing its surface, appearance, or working qualities. The arrangement of such grooves longitudinally in the meeting faces of the drag and cope parts of the mold has been heretofore suggested; but this is objectionable in that the surplus rubber flowing from the forming-cavity into the grooves is deposited in the form of a thickened rib connected to the tread-surface of the tire by a relatively-thinner flange or layer, which must be cut away upon the removal of the tire from the mold. The cutting away of this flange or layer is a delicate operation and leaves the tread-surface of the tire rough and unsightly and impairs its wearing qualities. By locating the grooves in the parting-walls of the cavity this objection is overcome, as the ribs and flanges are formed upon the sides of the tire, from which they can be removed without in any way marring the surface of the tread or injuring the appearance or wearing qualities of the tire.

It will be understood that the invention is not limited in use to the making of rubber tires, but may be employed for making segmental, circular, or spiral bands of any desired character and of any elastic material which may be substituted for or subserve the purposes of rubber. It will also be understood that changes in the form, proportion, and details of construction of the parts other than those indicated herein may be made without departing from the spirit and scope of the invention.

Having thus described the invention, what is claimed as new is—

1. A mold for making elastic bands of the character set forth, comprising coöperating parts having a spiral forming-cavity, and devices for holding a wire or plate to be embedded in the band.

2. A mold for making elastic bands, having a spiral forming-cavity, devices in said cavity for holding a plate or wire to be vulcanized in or to the band, and a holding device at or near one end of said cavity for retaining one end of the plate or wire.

3. A mold for making elastic bands, having a spiral cavity, and pins in said cavity for holding a plate or wire to be embedded in the band.

4. A mold for making elastic bands of the character set forth, comprising a separable box, a mandrel adapted to be fitted therein, and adjustable bearings in which the mandrel is rotatably mounted.

5. A mold for making elastic bands, &c., comprising a recessed drag and cope, a forming-mandrel fitted therein, bearings in which the mandrel is rotatably mounted, and means for adjusting said bearings to raise and lower the mandrel.

6. A mold for making elastic bands, &c., comprising recessed drag and cope portions provided with interior grooves forming a spiral cavity and auxiliary grooves in the parting ribs or walls of said cavity, and a mandrel having a spiral forming-groove coacting with the spiral forming-groove of the drag and cope and also with an auxiliary groove coacting with the said auxiliary grooves of the latter.

7. A mold for making elastic bands, &c., comprising a recessed drag and cope, a forming-mandrel fitted therein and having a spiral forming-cavity, a groove in the wall of said cavity to receive surplus material, pins in said cavity to retain a binding plate or wire therein, a holding device at or near one end of the plate or band, bearings in which the mandrel is rotatably mounted, and means for adjusting the bearings to raise and lower the mandrel.

8. A mold for making elastic bands, &c., comprising a recessed drag and cope, a forming-mandrel fitted therein, vertically-adjustable bearings in which the mandrel is rotatably mounted, each bearing having a rack, an adjusting-pinion meshing with the rack, and a pawl to hold the pinion against retrograde movement.

In testimony whereof I affix my signature in presence of two witnesses.

JULES A. COLLET.

Witnesses:
V. B. HILLYARD,
C. C. HINES.